(12) United States Patent
Rose

(10) Patent No.: US 11,646,972 B2
(45) Date of Patent: *May 9, 2023

(54) DYNAMIC ALLOCATION OF NETWORK RESOURCES USING EXTERNAL INPUTS

(71) Applicant: Comcast Cable Communications, LLC, Philadelphia, PA (US)

(72) Inventor: David Allen Rose, Parker, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/719,475

(22) Filed: Apr. 13, 2022

(65) Prior Publication Data

US 2022/0278939 A1   Sep. 1, 2022

Related U.S. Application Data

(63) Continuation of application No. 17/165,681, filed on Feb. 2, 2021, now Pat. No. 11,329,928, which is a continuation of application No. 14/698,929, filed on Apr. 29, 2015, now Pat. No. 10,951,538.

(51) Int. Cl.
  *H04L 47/52* (2022.01)
  *H04L 47/283* (2022.01)
  *H04L 47/80* (2022.01)
  *H04L 41/00* (2022.01)

(52) U.S. Cl.
  CPC ............ *H04L 47/522* (2013.01); *H04L 41/00* (2013.01); *H04L 47/283* (2013.01); *H04L 47/803* (2013.01)

(58) Field of Classification Search
  CPC .... H04L 47/283; H04L 47/522; H04L 47/803; H04L 41/00
  USPC ........................................................ 709/226
  See application file for complete search history.

(56) References Cited

U.S. PATENT DOCUMENTS

| | | | |
|---|---|---|---|
| 8,424,021 | B2 | 4/2013 | Kang et al. |
| 2003/0202649 | A1 | 10/2003 | Haug et al. |
| 2012/0144038 | A1 | 6/2012 | Hildebrand |
| 2012/0206559 | A1 | 8/2012 | Lin et al. |
| 2014/0207936 | A1 | 7/2014 | Friedlander et al. |
| 2014/0280847 | A1 | 9/2014 | Corson |
| 2015/0103754 | A1 | 4/2015 | Prokopenko et al. |
| 2016/0197848 | A1 | 7/2016 | Bhide et al. |

OTHER PUBLICATIONS

US Patent Application filed on Feb. 2, 2021, entitled "Dynamic Allocation of Network Resources Using External Inputs", U.S. Appl. No. 17/165,681.

*Primary Examiner* — Brendan Y Higa
*Assistant Examiner* — Leon Y Tseng
(74) *Attorney, Agent, or Firm* — BakerHostetler

(57) ABSTRACT

Systems and methods for managing network resources are disclosed. One method can comprise receiving first information relating to network traffic parameters and receiving second information relating to one or more contextual events having an effect on the network traffic parameters. The first information and the second information and be correlated. And one or more network resources can be allocated based on the correlation of the first information and the second information.

30 Claims, 7 Drawing Sheets

DYNAMIC ALLOCATION OF NETWORK RESOURCES USING EXTERNAL INPUTS

CROSS REFERENCE TO RELATED APPLICATIONS

This application is a continuation of U.S. patent application Ser. No. 17/165,681, filed Feb. 2, 2021, which is a continuation of U.S. patent application Ser. No. 14/698,929, filed Apr. 29, 2015, now U.S. Pat. No. 10,951,538, issued on Mar. 16, 2021, each of which is hereby incorporated by reference in their entirety.

BACKGROUND

Current allocation of transport layer services is based on static configurations such as time of day and day of week reservation. Such reservations can cause network service issues when planned or unplanned events such as political rallies, natural disasters, or other newsworthy events occur and drive network traffic (e.g., call volumes) above a normal state for an indefinite time frame. This disclosure addresses such and other shortcomings related to network management.

SUMMARY

It is to be understood that both the following general description and the following detailed description are exemplary and explanatory only and are not restrictive, as claimed. Methods and systems for managing a network are disclosed. The methods and systems described herein, in one aspect, can allocate network resources based upon contextual information that can have a predictive effect on network traffic.

In an aspect, methods can comprise receiving first information relating to network traffic parameters. Second information can be received relating to one or more contextual events having a current or predicted effect on the network traffic parameters. The first information and the second information can be correlated. One or more network resources can be allocated based on the correlation of the first information and the second information.

In an aspect, methods can comprise receiving first information relating to network traffic parameters, receiving second information relating to one or more contextual events having a current or predicted effect on the network traffic parameters, correlating the first information and the second information, allocating one or more network resources based on the correlation of the first information and the second information.

In an aspect, methods can receive first information from a first source relating to one or more contextual events. Second information can be received from a second source relating to one or more contextual events. One or more of the first information and the second information can be identified as having a predictive effect on network traffic. One or more network resources can be allocated and/or re-allocated, based on at least the identified one or more of the first information and the second information.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

In an aspect, models (e.g., call volume) for network traffic such as Internet protocol (IP) calls can be generated. As an example, historical traffic data can be used to generate call volume models for each identifier (e.g., NPA-NXX) by analyzing the historical trends. As a further example, events that can have an effect on network traffic can be correlated with signatures (e.g., spikes) in call volumes. As such, when similar events are subsequently detected, network resources such as processing allocation and bandwidth can be predictively adjusted to accommodate the increased call flows until the event is over or the public has lost interest in the event. As an example, if the volume of calls is limited by the available bandwidth on the transport layer, more bandwidth can be allocated to manage (e.g., terminate) the calls. As a further example, if the network is not the bottleneck but rather the call processing device (such as a Session Border Controller) additional processing resources (e.g., virtual instances) can be launched to meet the additional demand.

Figure 1:
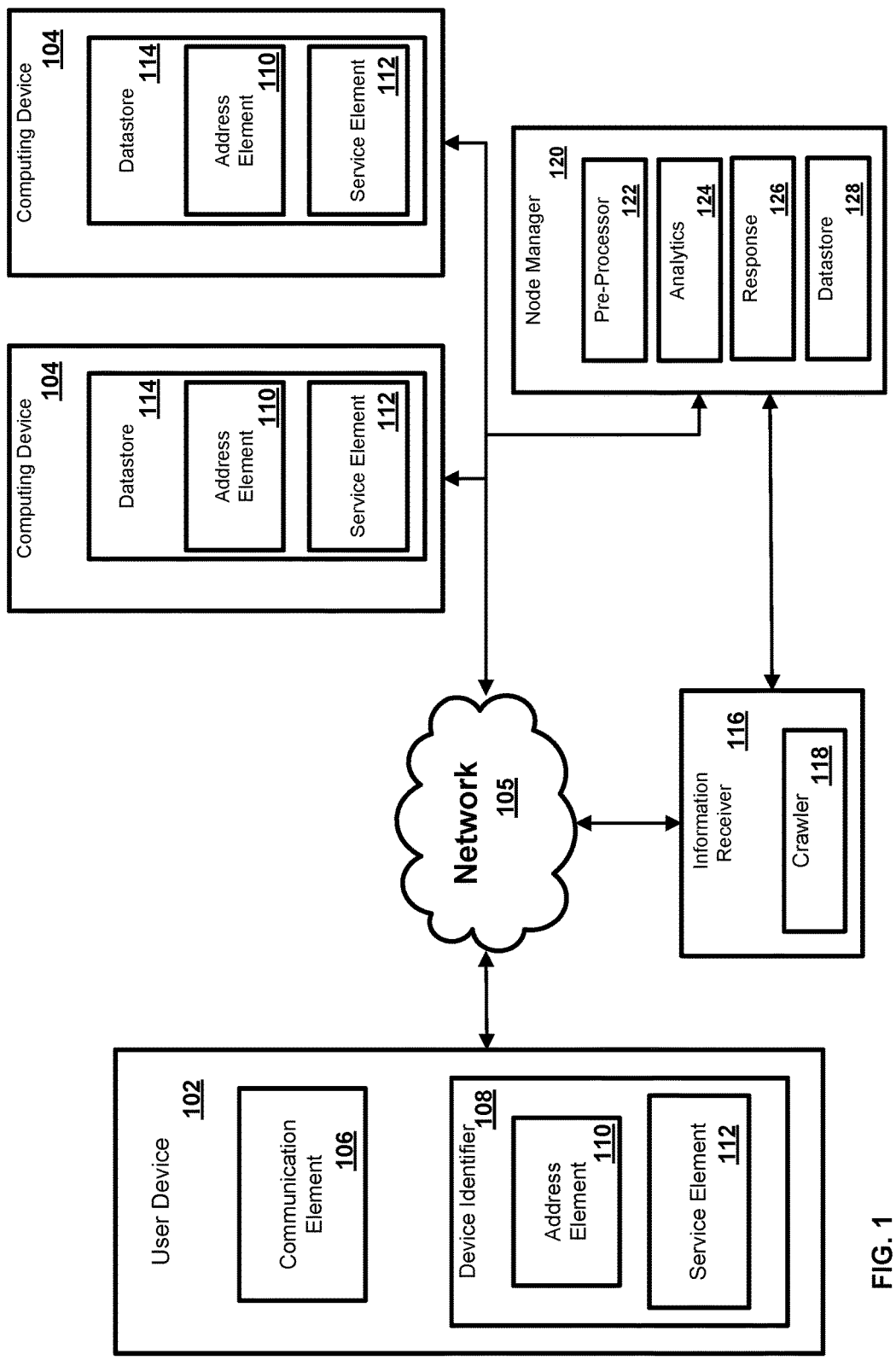
FIG. 1 is a block diagram of an example system and network.

FIG. 1 illustrates various aspects of an exemplary network in which the present methods and systems can operate. The present disclosure is relevant to systems and methods for managing a network, for example. Those skilled in the art will appreciate that present methods may be used in various types of networks and systems that employ both digital and analog equipment. The system is described as comprised of elements. An element can be software, hardware, or a combination of software and hardware. One skilled in the art will appreciate that provided herein is a functional description and that the respective functions can be performed by software, hardware, or a combination of software and hardware.

The system and network can comprise a user device 102 (e.g., physical computer host, virtual machine, IP-capable device) in communication with a computing device 104 such as a server or Network Interface Device (NID), for example. The computing device 104 can be disposed locally, or remotely, relative to the user device 102. As an example, the user device 102 and the computing device 104 can be in communication via a private and/or public network 105 such as the Internet. Other forms of communications can be used such as wired and wireless telecommunication channels, for example.

In an aspect, the user device 102 can be an electronic device such as a computer, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting information to the user and receiving user feedback, such as a web browser (e.g., Internet Explorer, Mozilla Firefox, Google Chrome, Safari, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device such as the computing device 104.

In an aspect, the user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device, such as a manufacturer, a model or type of device, a service provider associated with the user device 102, a state of the user device 102, a locator, and/or a label or classifier. Other information can be represented by the device identifier 108.

In an aspect, the device identifier 108 can comprise an address element 110 and a service element 112. In an aspect, the address element 110 can be an internet protocol address, a network address, an Internet address, or the like. As an example, the address element 110 can be relied upon to establish a communication session between the user device 102 and the computing device 104 or other devices and/or networks. As a further example, the address element 110 can be used as an identifier or locator of the user device 102.

In an aspect, the service element 112 can comprise an identification of a service provider associated with the user device 102 and/or with the class of user device 102. As an example, the service element 112 can comprise information relating to, or provided by, a communication service provider that is providing or enabling communication services to the user device 102. Services can be data services, such as internet access, financial data transfers, or various file transfer, voice, and/or video services, or a combination thereof. As a further example, the service element 112 can comprise information relating to a preferred service provider for one or more particular services relating to the user device 102. In an aspect, the address element 110 can be used to identify or retrieve the service element 112, or vice versa. As a further example, one or more of the address element 110 and the service element 112 can be stored remotely from the user device 102 and retrieved by one or more devices, such as the user device 102 and the computing device 104. Other information can be represented by the service element 112.

In an aspect, the computing device 104 can be a server for communicating with the user device 102. The computing device 104 can comprise one or more physical or virtual elements, such as a physical computer rack or virtual instance in a cloud computing environment. As an example, the computing device 104 can communicate with the user device 102 for providing services. In an aspect, the computing device 104 can allow the user device 102 to interact with remote resources, such as data, devices, and files. As an example, the computing device can be configured as central location, a headend, or processing facility, which can receive content (e.g., data, input programming) from multiple sources. The computing device 104 can combine the content from the various sources and can distribute the content to user locations via a distribution system.

In an aspect, the computing device 104 can manage the communication between the user device 102 and a database 114 for sending and receiving data therebetween. As an example, the database 114 can store a plurality of files, webpages, user identifiers or records, or other information. As a further example, the user device 102 can request and/or retrieve a file from the database 114. In an aspect, the database 114 can store information relating to the user device 102, such as the address element 110 and/or the service element 112. As an example, the computing device 104 can obtain the device identifier 108 from the user device 102 and retrieve information from the database 114, such as the address element 110 and/or the service elements 112. As a further example, the computing device 104 can obtain the address element 110 from the user device 102 and can retrieve the service element 112 from the database 114, or vice versa. Any information can be stored in and retrieved from the database 114. The database 114 can be disposed remotely from the computing device 104 and accessed via direct or indirect connection. The database 114 can be integrated with the computing device 104 or some other device or system.

In an aspect, an information receiver 116 can be configured to receive or access various information. As an example, the information receiver 116 can be configured to receive or access information from one or more of a call detail record, weather information, E911 information, website information, emergency broadcast information, video feed, news feed, and geological information source. As a further example, the information receiver 116 can comprise a web crawler 118 for continuously or periodically scanning content on a network (e.g., the Internet) for particular key factors or key words.

In an aspect, the node manager 120 can be configured to receive information from at least the information receiver 116, process the received in formation, and allocate one or more resources such as the computing devices 104 (e.g., computing nodes). The node manager 120 can comprise a pre-processor component 122 configured to receive data from various sources such as one or more computing nodes (e.g., computing device 104) and the information receiver 116. As an example, the pre-processor component 122 may be configured to receive a data dump of information and/or may be configured to process the received or accessed data to filter at least a portion of the received or accessed data. As a further example, the pre-processor component 122 can be configured to filter/classify received information based on significance. Such significance can be based upon one or more parameters such as a location, source identifier, readership level, or content type.

The node manager 120 can comprise an analytics component 124 configured to access or receive data (communication flows), for example, from the pre-processing component 122 or other datasource. The analytics component 124 can be configured to analyze the received data, for example, using a machine learning algorithm to identify the data as representative of activity that can have an effect on network traffic. As an example, the analytics component 124 can be configured to process the received data (e.g., via an MD5 hash) to determine if the data matches historical information. Various time and location information related to the received data can be analyzed and stored. As another example, the analytics component 124 can be configured to compare word count and content with other sources and time periods. Based on the variance, date, time, geolocation, word content, and source weight, the received data can be classified and weight can be assigned to portions of the data (e.g., an event). As a further example, the analytics component 124 can be configured to classify received communications flows into source/destination pairs corresponding to geolocation points or NPA-NXX (named cities.

In an aspect, the analytics component 124 can be configured to compare received data to stored data (e.g., historical data). As an example, the comparison can include identifying signatures and/or patterns in the received data. The comparison can also result in the determination of a deviation from normal operation. Based on the comparison, a response component 126 can be configured to implement remediation actions such as allocating bandwidth, launching virtual instances, and throttling network traffic. Received or accessed information, classifications, statistics, and/or remediation logs can be stored in a datastore 128.

Figure 2:
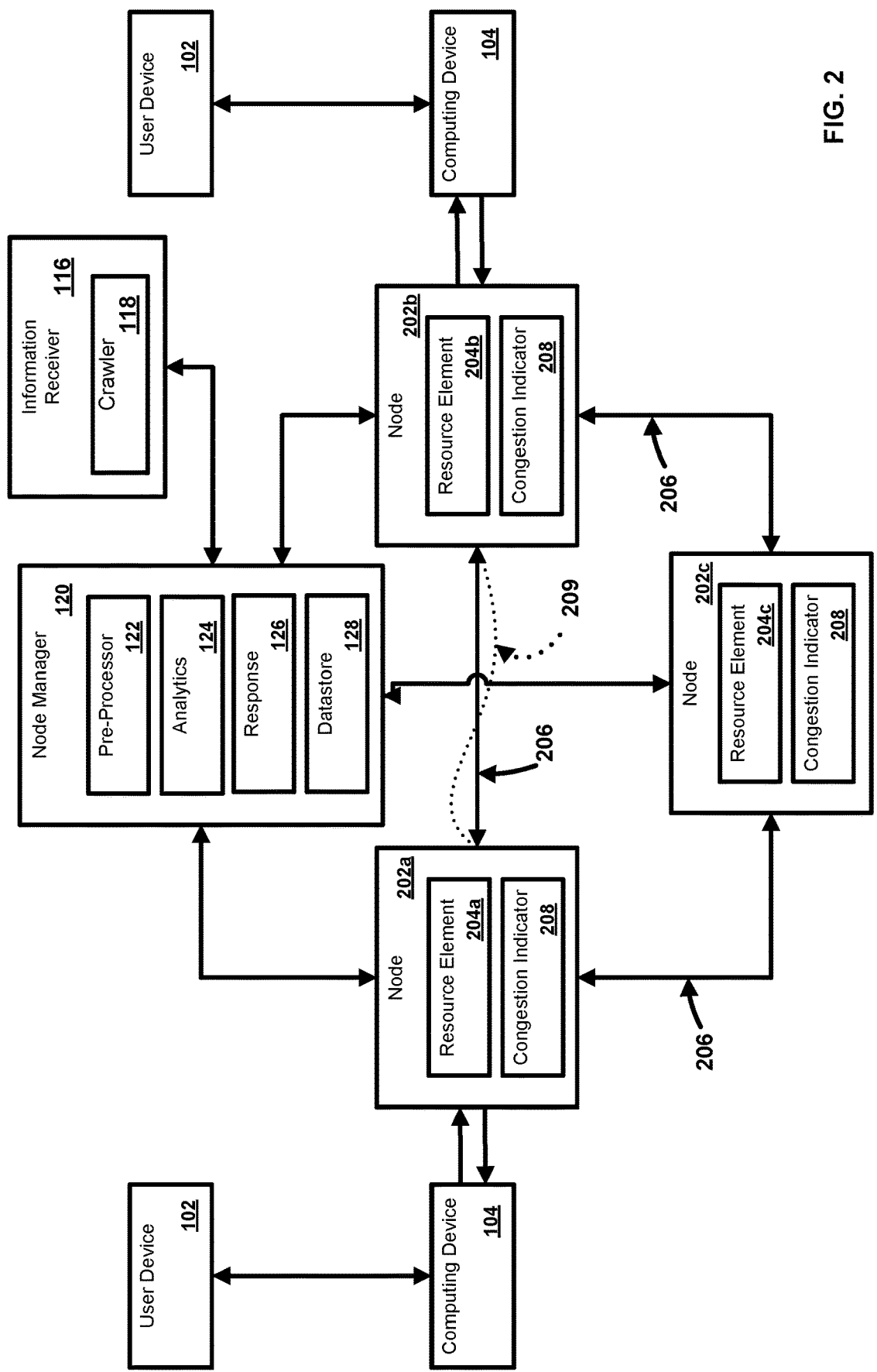
FIG. 2 is a block diagram of an example system and network.

FIG. 2 illustrates an exemplary system and network. In an aspect, a plurality of nodes 202a, 202b, 202c can be in communication with one or more user devices 102 and/or one or more computing devices 104. One or more of the nodes 202a, 202b, 202c can comprise physical computing hosts and/or virtual instances hosted thereby. As shown in FIG. 2, the information receiver 116 and node manager 120 can be configured to monitor and manage resources such as the nodes 202a, 202b, 202c. One or more of the nodes 202a, 202b, 202c can be a network access point, router, switch, network interface, or other communication device. As an example, one or more user devices 102 can be an electronic device, such as a computer, a smartphone, a laptop, a tablet, a set top box, a display device, or other device capable of communicating with one or more of the nodes 202a, 202b, 202c of the network. As a further example, one or more computing devices 104 can be a server, a gateway, customer premises equipment (CPE), network interface device (NID), optical networking unit (ONU), headend, terminal server, cable modem terminal system, or other network device. As an example, one or more of the nodes 202a, 202b, 202c can be configured to communicate with at least one of the other of the nodes 202a, 202b, 202c and/or one or more of the computing devices 104 via one or more communication paths 206. In an aspect, the one or more communication paths 206 can comprise one or more uninterrupted communication links, sequential links, pre-defined paths or links, and/or intervening nodes. Links can comprise a single point-to-point connection between two devices or access points. Paths can comprise one or more links. As an example, one or more of the communication paths 206 can comprise one or more of the nodes 202a, 202b, 202c. As a further example, one or more of the nodes 202a, 202b, 202c can be configured as a mesh network. In an aspect, one or more of the communication paths 206 can be configured to transmit one or more services.

In an aspect, one or more resource elements 204a, 204b, 204c can comprise information relating to one or more of the communication paths 206. One or more resource elements 204a, 204b, 204c can comprise information relating to congestion, path priority, path cost, capacity, bandwidth, signal strength, latency, error rate, path usage, and the like. As an example, a congestion indicator 208 can represent that a delay 209 is being experienced in network traffic. A congestion indicator can comprise a bit flag in a packet header, an advertised window size, a number of retransmissions, a call volume indication (e.g., model) and the like. As a further example, the resource elements 204a, 204b, 204c can be configured to allocate resources such as allocating bandwidth, launching virtual instances, and throttling network traffic.

Figure 3:
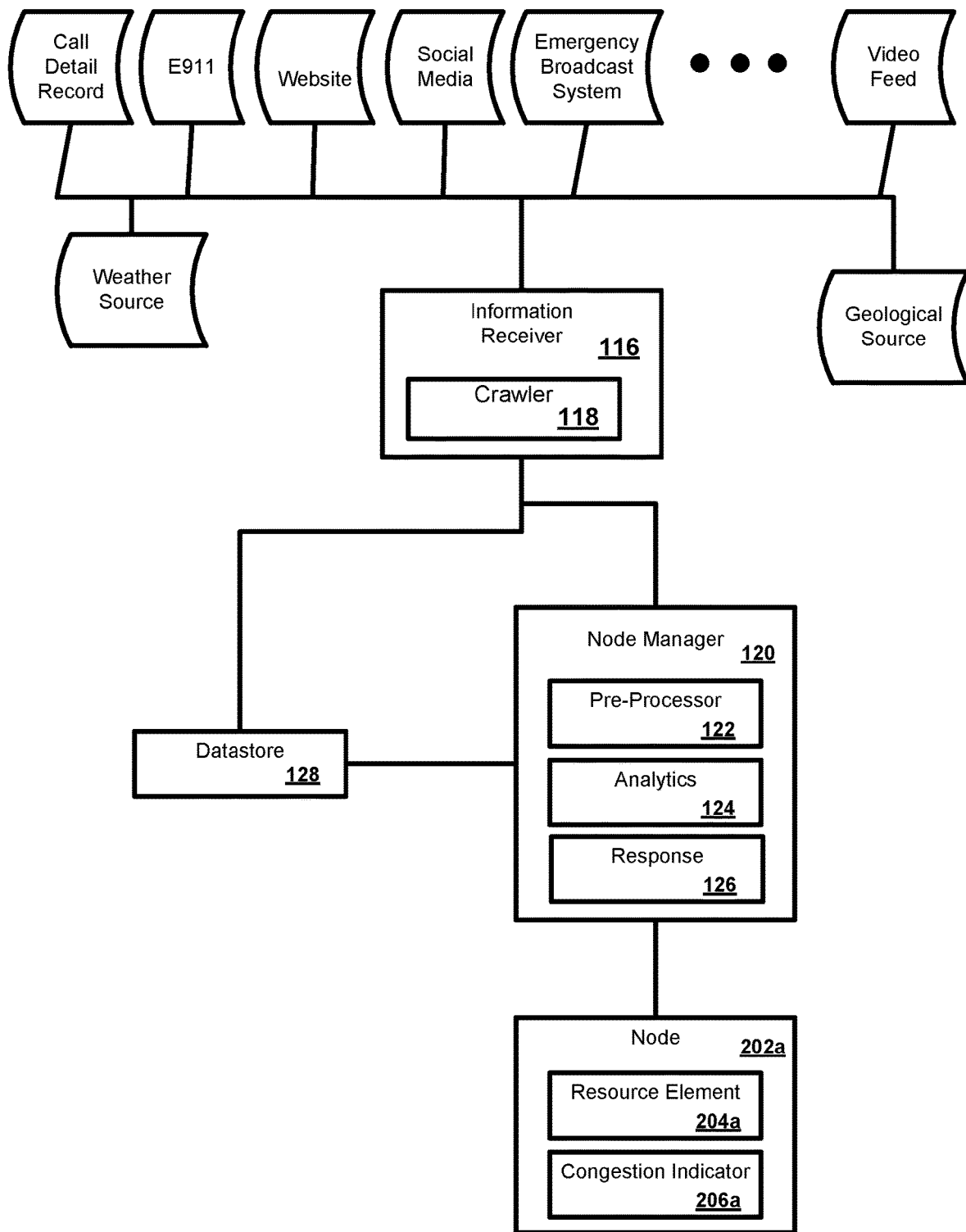
FIG. 3 is a block diagram of an example system and network.

As shown in FIG. 3, the information receiver 116 can access or receive information from various content sources such as a call detail record, social media, weather information, E911 information, website information, emergency broadcast information, video feed, news feed, and/or geological information source. Other sources can be accessed or be comprised as the information receiver 116. Such received or accessed information can be stored in the datastore 128. The node manager 120 can receive or access information and can allocate one or more resources such as node 202a in a predictive manner.

As an example, Table 1 below is a representation of the 2010 census data for New York City and its boroughs and estimates for 2013. Table 1 uses rounded numbers to simplify the illustrative example.

TABLE 1

| | |
|---|---|
| New York State: | 19.4M |
| New York City: | 8M |
| Manhattan: | 1.5M |
| Brooklyn: | 2.3M |
| Queens: | 2.2M |
| Bronx: | 1.4M |
| Staten Island: | .5M |
| NYC Metro Area Ratios (rough percentage of the population of NYC that each borough contributes to the total) | |
| NYC Total Pop: | 8M |
| Brooklyn | 28% |
| Queens | 27% |
| Manhattan | 18% |
| Bronx | 17% |
| Staten Island | 6% |

Using the percentages of population that each borough contributes to the total population of NYC and obtaining the readership numbers of each major and minor news outlet in the NYC metro area, the relevance of a news story can be one can extrapolated based on at least these two metrics. For example, if there is an event in NYC and the breaking news has limited information, the headline may read "Fire in Brooklyn Building." The cause of the fire may be initially unknown. This type of event can cause an increase in phone calls to the Brooklyn area. Cell towers and central offices may experience a spike in inbound and outbound calls from first responders as well as those working in the area to communicate with family members, for example. Normal calling patterns or historical calling patterns can be used to correlate the increase in volume of calls to/from the lower Manhattan area with the news and keywords obtained from the event. Using the correlation information, a predictor (e.g., traffic impact increase percentage) can be generated based on the searchable words such as location, news source, readership levels, and content type (e.g., stock market crash, train crash, election results, etc.). The predictor can be used to allocate (e.g., deploy) the network resources accordingly, for example, so that time sensitive communications can be prioritized over lesser time sensitive communications. As a further example, a VoIP or Video call can receive a higher priority through the network than an email.

In an aspect, each input to the node manager 120 can be compared to historical events as well as ongoing real-time events to determine the validity of the data and the potential level of impact on a communications flow. Using a news story about the severe snow storm on Jan. 15, 2013, as an example, a classification method of this event can be visualized. Data stores can contain predefined keywords for various types of events such as traffic delays, business closure, financial crash, fire, vehicle accident, or the like. Based on the weight of importance assigned to each keyword and the patterns within the data sources, the event type and respective weight can be leveraged to determine its probability of impacting communications flows. As an example, a particular event type can be assigned a weight factor based on a projected or probable impact of such events of the event type on the network traffic. As another example, certain sources can be weighted based on reliability of the particular source. Such reliability can be based on historical patterns or can be calculated based on statistical analysis and/or machine learning algorithm. Other weighting factors can be applied to various characteristics of event information such as location of the event, frequency of the event, severity of the event, etc.

In an aspect, call detail records can be classified. Other data sources such as E911 call flows can be used to correlate the increase/decrease of traffic with the contextual events to either increase or decrease the validity of the classification and weight of the event. Additional metrics to include in the classification process are calls to and from the destination near the location of the event. Another part of the classification process can be the number of occurrences a keyword or its synonym has within a single data source; the more occurrences of words such as bombs, explosions, and numbers killed or dead, the stronger the likelihood that this event will cause significant changes in communications flow patterns. Data sources can also play a role in the classification and weighting of an event.

Figure 4:
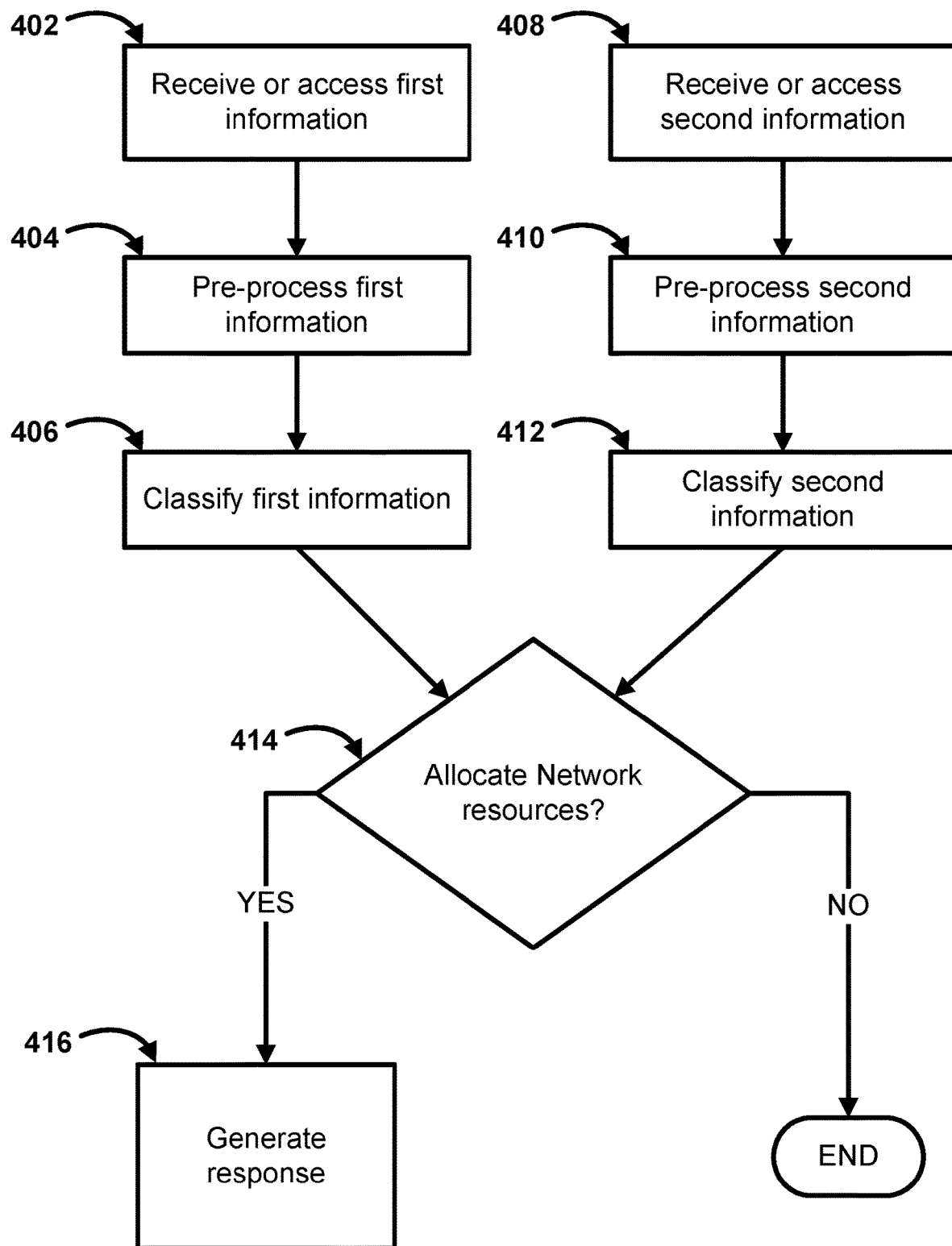
FIG. 4 is a flow chart of an example method.
Figure 5:
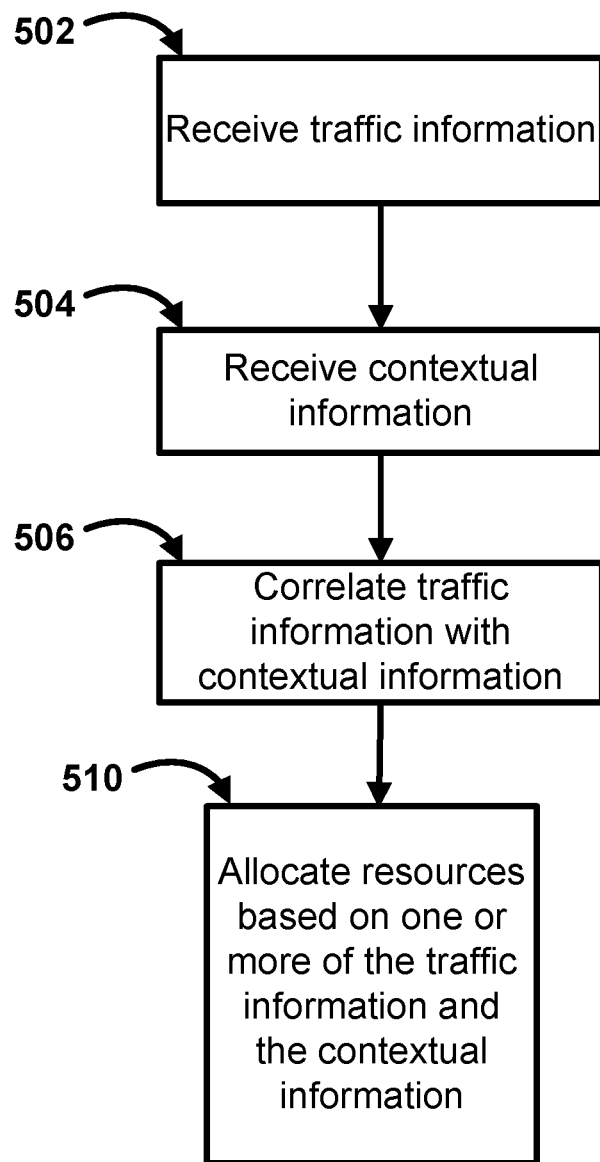
FIG. 5 is a flow chart of an example method.
Figure 6:
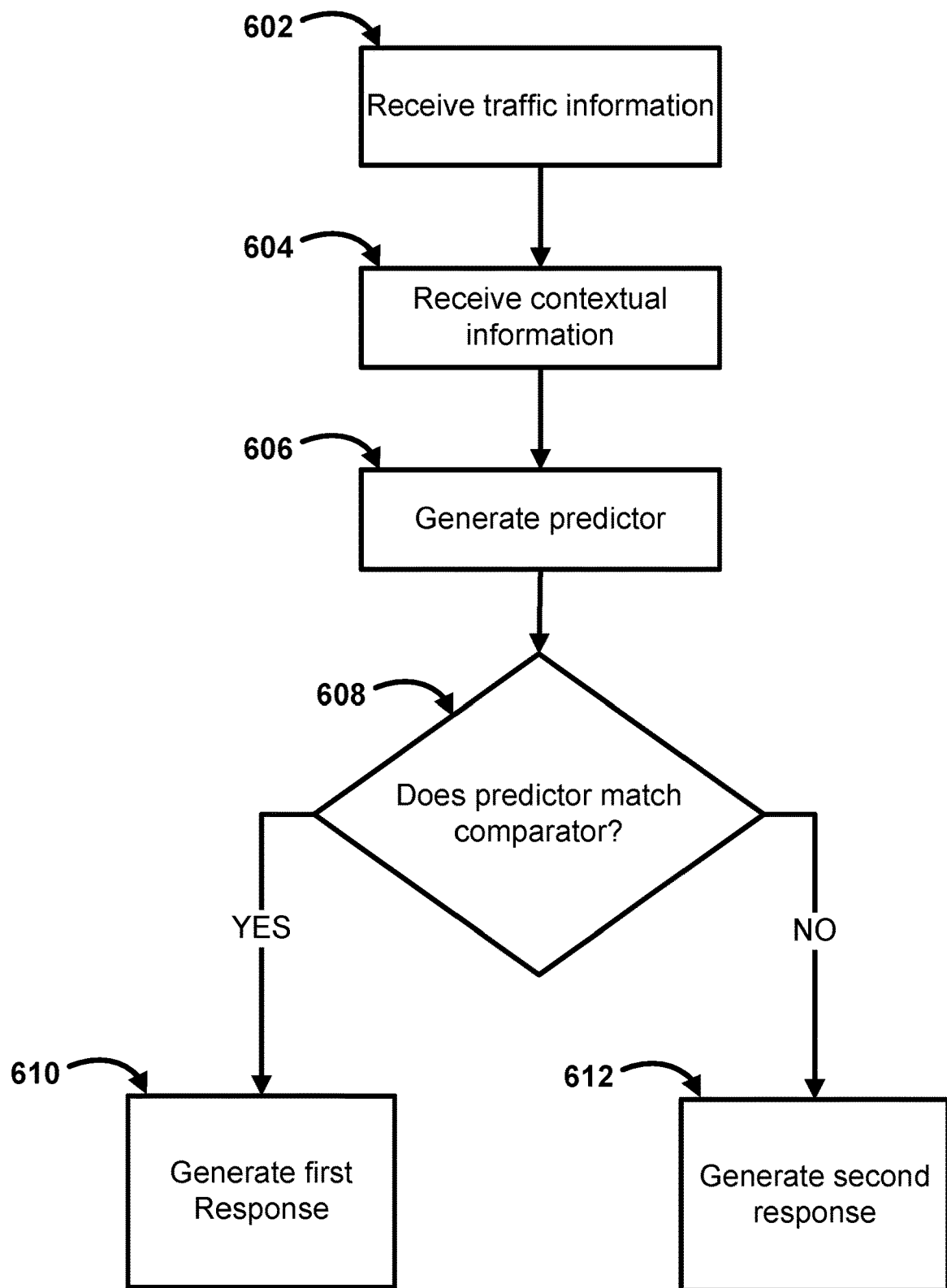
FIG. 6 is a flow chart of an example method.

FIGS. 4-6 illustrate operating procedures that can be used to mitigate the negative impacts of data transmission. In an aspect, FIG. 4 depicts example operating procedures that may be implemented by the systems and networks described herein. For example, in operation or step 402, first information can be received or accessed, for example from at least the information receiver 116. The first information can relate to network traffic. The first information can comprise call volume, bandwidth, number of packet transmission, packet reception, packet re-transmissions, packet loss, congestion indicators, congestion window size, number of call setups/call setup requests, web page requests, memory or processor usage, latency, and the like.

In operation or step 404, the first information can be pre-processed. As an example, pre-processing can comprise filtering received information based on significance. Such significance can be based upon one or more parameters such as a location, source identifier, readership level, or content type. As an example, information with a high readership (e.g., based on a threshold number of viewers) can be considered more significant than information with a lower readership. The filtered information can be discarded or cached for subsequent processing, giving processing priority to the unfiltered information.

In operation or step 406, the first information can be classified. As an example, machine learning can be used identify the data as representative of activity that can have an effect on network traffic. As another example, classification can comprise processing the received data (e.g., via an MD5 hash) to determine if the data matches historical information or could be an exact duplicate of a current story (e.g., a reprint of a news story, a re-post of social media, etc.). Various time and location information related to the received data can be analyzed and stored. Classification can comprise comparing word count and content with other sources and time periods. Based on the variance, date, time, geo-location, word content, and source weight, the received data can be classified and weight can be assigned to portions of the data (e.g., an event).

In operation or step 408, second information can be received or accessed, for example from at least the information receiver 116. The second information can relate to network traffic. The second information can comprise call volume, bandwidth, number of packet transmission, packet reception, packet re-transmissions, packet loss, congestion indicators, congestion window size, number of call setups/call setup requests, web page requests, memory or processor usage, latency, and the like.

In operation or step 410, the second information can be pre-processed. As an example, pre-processing can comprise filtering received information based on significance. Such significance can be based upon one or more parameters such as a location, source identifier, readership level, or content type.

In operation or step 412, the second information can be classified. As an example, received communications flows can be classified into source/destination pairs corresponding to geo-location points or NPA-NXX (named cities. Received data can be compared to stored data (e.g., historical data). As an example, the comparison can include identifying signatures and/or patterns in the received data. The comparison can also result in the determination of a deviation from normal operation.

In operation or step 414, based on one or more of the classified first information and the classified second information, a decision to allocate one or more network resources can be made. For example, when an event may have an effect on network traffic, one or more network resources can be allocated based on the correlation of the traffic information and the event, at operation 416. Allocating the one or more network resources can comprise allocating bandwidth in the network, launching virtual machine (processing) instances, and throttling network traffic.

In certain aspects, various content sources can be continuously or periodically scanned for key-words such as earthquake, flood, hurricane, fire, and the like. When predefined key-word are located, such located key-words can be correlated to network traffic information (e.g., call volume increase or decrease). As such, events in the network traffic can be associated with events in the real world. As an example, an increase in network traffic can be correlated with an earthquake in San Francisco. As another example, a decrease in call volume can occur when a local carrier is disabled in a local service area. As such, a decision to allocate one or more network resources can be based on the correlations. As an example, if the volume of calls is limited by the available bandwidth on the transport layer, more bandwidth can be allocated to terminate the calls using NVF or some other existing technology. If the network is not the bottleneck, but rather the call processing device (such as a Session Border Controller), additional virtual instances of the required resource can be launched in the service platform (e.g., cloud) to meet the additional demand. As a further example, available resources can be re-configured to provide emergency support for certain services (e.g., voice), while temporarily reducing recourse available to other services, such as services with lower immediate or localized demand.

FIG. 5 depicts example operating procedures that may be implemented by the systems and networks described herein. In operation or step 502, traffic information can be received or accessed. The traffic information can comprise call volume, bandwidth, number of packet transmission, packet reception, packet re-transmissions, packet loss, congestion indicators, congestion window size, number of call setups/call setup requests, web page requests, memory or processor usage, latency, and the like.

In operation or step 504, contextual information can be received or accessed. The contextual information can relate to one or more contextual events having a current or predicted effect on the network traffic parameters. The contextual information can comprise one or more of a call detail record, weather information, E911 information, website information, emergency broadcast information, video feed, news feed, and geological information source. The contextual information can be classified and/or filtered based on various metrics or metadata such as location, source identifier, readership level, and content type.

In operation or step 506, the traffic information and the contextual information can be correlated. Such correlation can comprise comparing one or more network signatures of the traffic information to portions of the contextual information. The correlation can comprise identifying network patterns, for example, by comparing the contextual information to historical events represented by the traffic information.

In operation or step 508, one or more network resources can be allocated based on the correlation of the traffic information and the contextual information. Allocating the one or more network resources can comprise allocating bandwidth in the network, launching virtual machine instances, and throttling network traffic. As an example, contextual events such as disruptive weather patterns may be correlated with increased call volumes. As such, when information (e.g., keywords) relating to a subsequent disruptive weather pattern is located via scanning various content sources, network resource can be preemptively adjusted to manage the expected increase in calls. For example, additional bandwidth can be allocated to terminate the expected influx in calls and/or additional virtual instances of the required resource can be launched in the service platform. As a further example, available resources can be re-configured to provide emergency support for certain services (e.g., voice), while temporarily reducing recourse available to other services, such as services with lower immediate or localized demand.

FIG. 6 depicts example operating procedures that may be implemented by the systems and networks described herein. In operation or step 602, traffic information can be received or accessed. The traffic information can comprise call volume, bandwidth, number of packet transmission, packet reception, packet re-transmissions, packet loss, congestion indicators, congestion window size, number of call setups/call setup requests, web page requests, memory or processor usage, latency, and the like.

In operation or step 604, contextual information can be received or accessed. The contextual information can relate to one or more contextual events having a current or predicted effect on the network traffic parameters. The contextual information can comprise one or more of a call detail record, weather information, E911 information, website information, emergency broadcast information, video feed, news feed, and geological information source. The contextual information can be classified and/or filtered based on various metrics or metadata such as location, source identifier, readership level, and content type.

In operation or step 606, a predictor can be generated, for example, based upon one or more of the traffic information and the contextual information. As an example, correlating the contextual information with traffic information can be used to generate the predictor (e.g., traffic impact increase percentage). The predictor can be generated based on the key words such as location, news source, readership levels, and content type (e.g., stock market crash vs. train crash). In an aspect, historical traffic information and historical event information can be processed by a machine learning algorithm to determine causal relationship between traffic patterns and related events. As such, a predictor can be generated to represent the causal relationship. For example, the predictor can represent particular event conditions that have been predicted to result in an increase in network traffic.

In operation or step 608, the predictor can be compared to a comparator such as subsequent data signatures. If the predictor matches a portion of the data, a first response can be generated at operation or step 610. The first response can comprise allocating bandwidth, launching virtual instances, and throttling network traffic. If the predictor does not match a portion of the data, a second response can be generated at operation or step 612. The second response can comprise receiving or accessing additional information.

As an illustrative example, contextual events such as voting results announcement may be correlated with increased call volumes. As such, when information (e.g., keywords) relating to a subsequent results announcements is located via scanning various content sources, network resource can be preemptively adjusted to manage the expected increase in calls. For example, additional bandwidth can be allocated to terminate the expected influx in calls and/or additional virtual instances of the required resource can be launched in the service platform. As a further example, available resources can be re-configured to provide emergency support for certain services (e.g., voice), while temporarily reducing recourse available to other services, such as services with lower immediate or localized demand.

Figure 7:
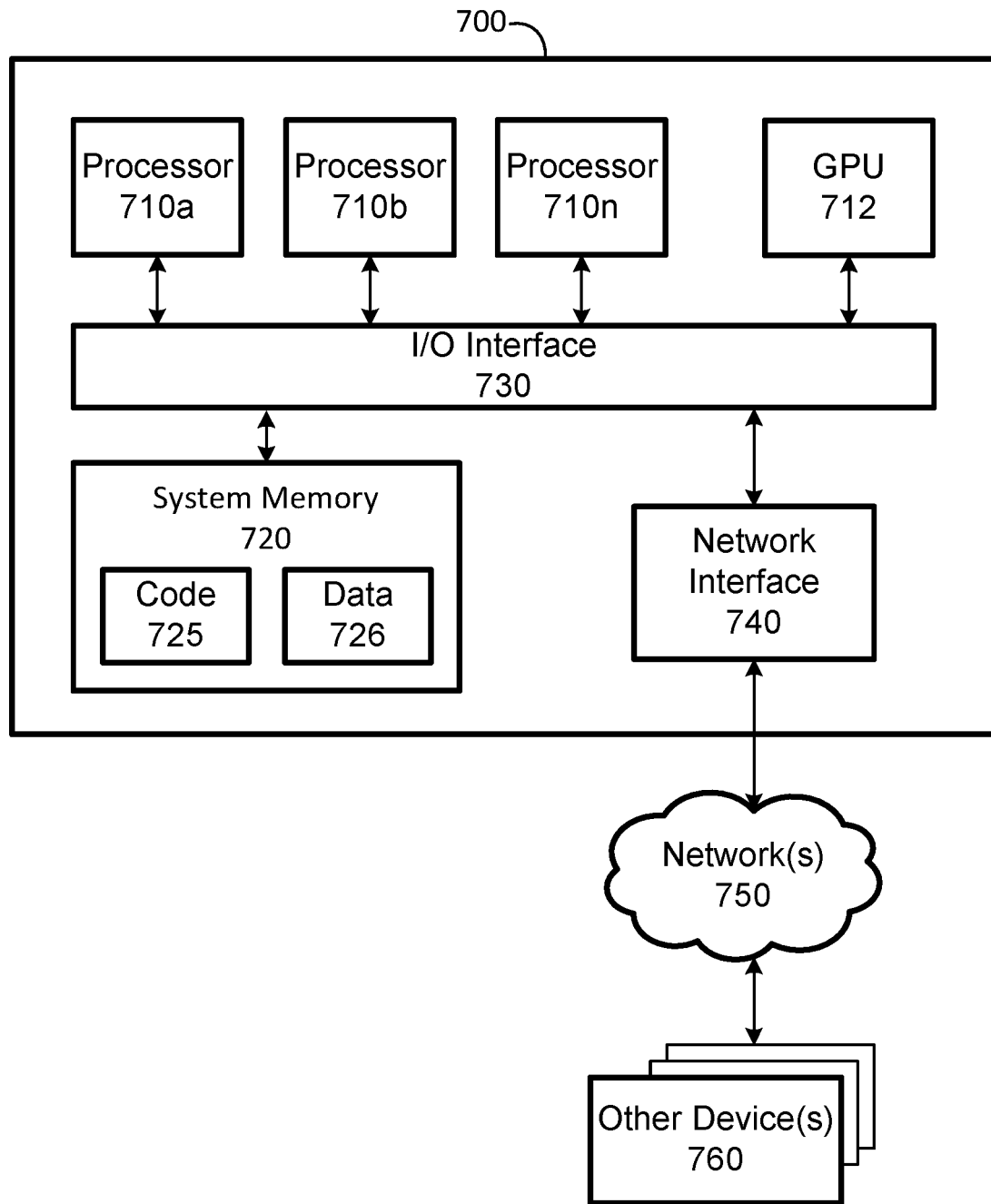
FIG. 7 is a block diagram of an example computing device.

FIG. 7 depicts a general-purpose computer system that includes or is configured to access one or more computer-accessible media. In the illustrated embodiment, computing device 700 includes one or more processors 710a, 710b, and/or 710n (which may be referred herein singularly as a processor 710 or in the plural as the processors 710) coupled to a system memory 720 via an input/output (I/O) interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processor(s) 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, a graphics processing unit ("GPU") 712 may participate in providing graphics rendering and/or physics processing capabilities. A GPU may, for example, comprise a highly parallelized processor architecture specialized for graphical computations. In some embodiments, processors 710 and GPU 712 may be implemented as one or more of the same type of device.

System memory 720 may be configured to store instructions and data accessible by processor(s) 710. In various embodiments, system memory 720 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques and data described above, are shown stored within system memory 720 as code 725 and data 726.

In one embodiment, I/O interface 730 may be configured to coordinate I/O traffic between processor(s) 710, system memory 720 and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 620, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 740 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 720 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 700 as system memory 720 or another type of memory. Further, a computer-accessible medium may include transmission media or signals, such as electrical, electromagnetic or digital signals, conveyed via a communication medium, such as a network and/or a wireless link, such as those that may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes or computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on), and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may comprise any combination of hardware or software that may interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some aspects be combined in fewer modules or distributed in additional modules. Similarly, in some aspects the functionality of some of the illustrated modules may not be provided and/or other additional functionality may be available.

Each of the operations, processes, methods, and algorithms described in the preceding sections may be embodied in, and fully or partially automated by, code modules executed by at least one computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example aspects. The example systems and components described herein may be configured differently than described. For example, elements may be added to, removed from, or rearranged compared to the disclosed example aspects.

It will also be appreciated that various items are illustrated as being stored in memory or on storage while being used, and that these items or portions of thereof may be transferred between memory and other storage devices for purposes of memory management and data integrity. Alternatively, in other aspects some or all of the software modules and/or systems may execute in memory on another device and communicate with the illustrated computing systems via inter-computer communication. Furthermore, in some aspects, some or all of the systems and/or modules may be implemented or provided in other ways, such as at least partially in firmware and/or hardware, including, but not limited to, at least one application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other aspects. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain aspects include, while other aspects do not include, certain features, elements, and/or steps. Thus, such conditional language is not generally intended to imply that features, elements, and/or steps are in any way required for at least one aspects or that at least one aspects necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example aspects have been described, these aspects have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the claims.

The invention claimed is:

1. A method, comprising:
receiving, by one or more computing devices, first information relating to network traffic parameters associated with a network;
receiving, by the one or more computing devices, second information relating to one or more events external to the network having an effect on the network traffic parameters;
determining, based on the first information and the second information, a traffic pattern of the network; and
allocating, based on the determined traffic pattern, one or more network resources.

2. The method of claim 1, wherein the network traffic parameters comprise one or more of congestion, call volume, retransmissions, or packet loss.

3. The method of claim 1, wherein the second information comprises one or more of a call detail record, weather information, E911 information, website information, emergency broadcast information, video feed, news feed, or geological information source.

4. The method of claim 1, wherein the second information comprises one or more of a location, source identifier, readership level, or content type.

5. The method of claim 1, wherein the determining the traffic pattern comprises comparing one or more network signatures of the network traffic parameters to portions of the second information.

6. The method of claim 1, further comprising:
applying a weight factor to at least a portion of the second information, wherein the determining the traffic pattern is based at least in part on the applied weight factor.

7. The method of claim 1, wherein the allocating the one or more network resources comprises allocating telephony bandwidth to one or more services affected by the one or more events external to the network.

8. The method of claim 1, wherein the allocating the one or more network resources comprises launching virtual instances to manage network traffic associated with the network traffic parameters.

9. The method of claim 1, wherein the allocating the one or more network resources comprises allocating more call bandwidth and less video bandwidth to one or more services affected by the one or more events external to the network.

10. A method, comprising:
receiving, by one or more computing devices, first information relating to network traffic parameters associated with a network;
receiving, by the one or more computing devices, second information relating to one or more events external to the network having an effect on the network traffic parameters;
determining an effect the second information has on the network operating under the network traffic parameters; and
allocating, based on the first information and the second information, one or more network resources.

11. The method of claim 10 wherein the network traffic parameters comprise one or more of congestion, call volume, retransmissions, or packet loss.

12. The method of claim 10, wherein the second information comprises one or more of a call detail record, weather information, E911 information, website information, emergency broadcast information, video feed, news feed, or geological information source.

13. The method of claim 10, wherein the second information comprises one or more of a location, source identifier, readership level, or content type.

14. The method of claim 10, wherein the determining the effect comprises comparing one or more network signatures of the network traffic parameters to portions of the second information.

15. The method of claim 10, further comprising:
applying a weight factor to at least a portion of the second information, wherein the determining the effect is based at least in part on the applied weight factor.

16. The method of claim 10, wherein the allocating the one or more network resources comprises allocating telephony bandwidth to one or more services affected by the one or more events external to the network.

17. The method of claim 10, wherein the allocating the one or more network resources comprises launching virtual instances to manage network traffic associated with the network traffic parameters.

18. The method of claim 10, wherein the allocating the one or more network resources comprises allocating more call bandwidth and less video bandwidth to one or more services affected by the one or more events external to the network.

19. A system, comprising:
a network; and
one or more computing devices configured to:
receive first information relating to network traffic parameters associated with the network;
receive second information relating to one or more contextual events external to the network having an effect on the network traffic parameters;
determine, based on the first information and the second information, a traffic pattern of the network; and
allocate, based on the determined traffic pattern, one or more network resources.

20. The system of claim 19, wherein the network traffic parameters comprise one or more of congestion, call volume, retransmissions, or packet loss.

21. The system of claim 19, wherein the second information comprises one or more of a call detail record, weather information, E911 information, website information, emergency broadcast information, video feed, news feed, or geological information source.

22. The system of claim 19, wherein the second information comprises one or more of a location, source identifier, readership level, or content type.

23. The system of claim 19, wherein the allocating the one or more network resources comprises allocating telephony bandwidth to one or more services affected by the one or more contextual events external to the network.

24. The system of claim 19, wherein the allocating the one or more network resources comprises launching virtual instances to manage network traffic associated with the network traffic parameters.

25. A system, comprising:
a network; and
one or more computing devices configured to:
receive first information relating to network traffic parameters associated with the network;
receive second information relating to one or more events external to the network having an effect on the network traffic parameters;
determine an effect the second information has on the network operating under the network traffic parameters; and allocate, based on the first information and the second information, one or more network resources.

26. The system of claim 25, wherein the network traffic parameters comprise one or more of congestion, call volume, retransmissions, or packet loss.

27. The system of claim 25, wherein the second information comprises one or more of a call detail record, weather information, E911 information, website information, emergency broadcast information, video feed, news feed, or geological information source.

28. The system of claim 25, wherein the second information comprises one or more of a location, source identifier, readership level, or content type.

29. The system of claim 25, wherein the allocating the one or more network resources comprises allocating telephony bandwidth to one or more services affected by the one or more events external to the network.

30. The system of claim 25, wherein the allocating the one or more network resources comprises launching virtual instances to manage network traffic associated with the network traffic parameters.

\* \* \* \* \*